UNITED STATES PATENT OFFICE.

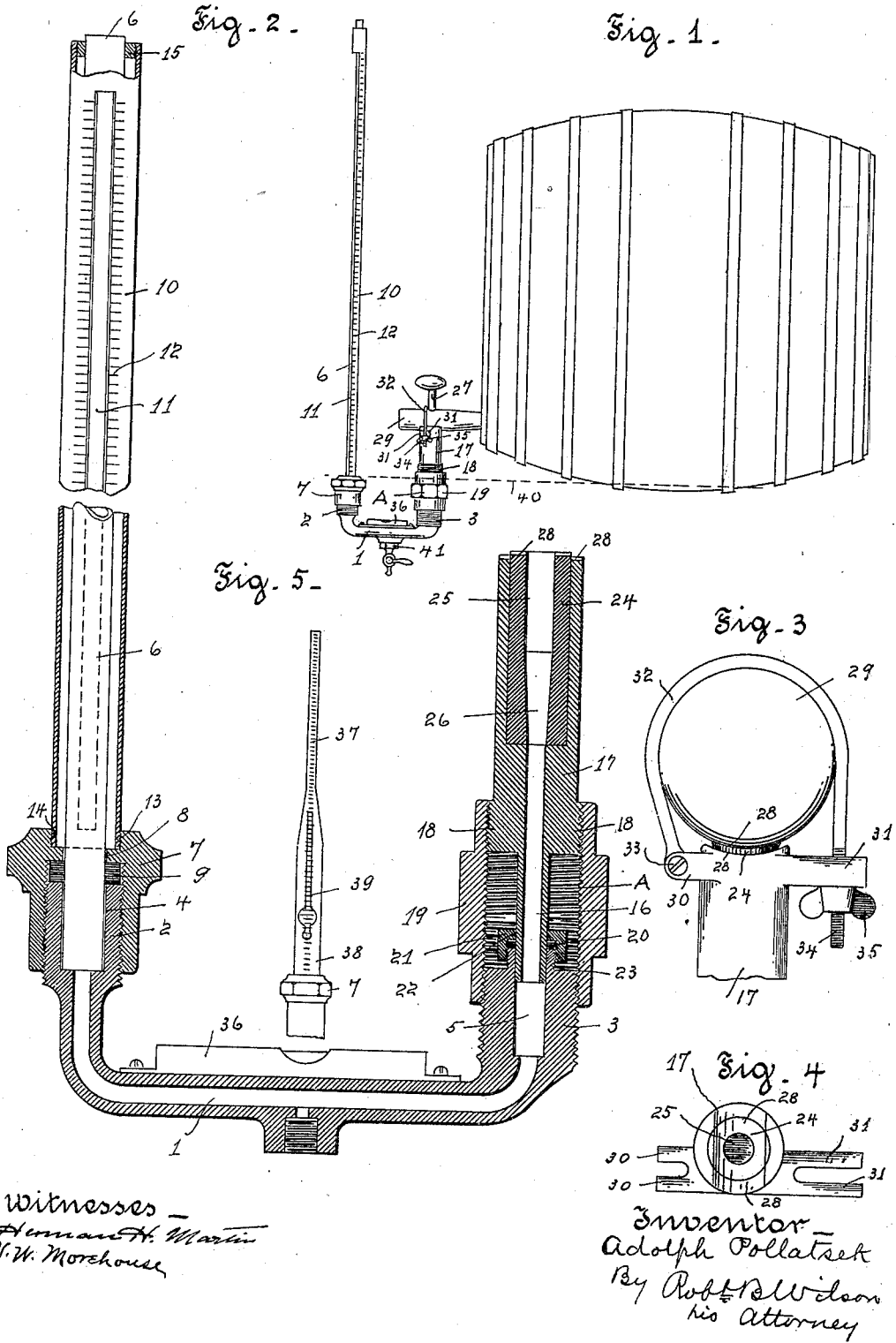

ADOLPH POLLATSEK, OF TOLEDO, OHIO.

GAGE FOR LIQUIDS.

SPECIFICATION forming part of Letters Patent No. 672,492, dated April 23, 1901.

Application filed January 10, 1901. Serial No. 42,732. (No model.)

*To all whom it may concern:*

Be it known that I, ADOLPH POLLATSEK, a citizen of the United States, residing at Toledo, in the county of Lucas and State of Ohio, have invented a new and useful Improvement in Gages for Liquids, of which the following is a specification.

My invention relates to a gage for liquids, and has for one object to provide a device of the kind that will accurately measure the depth of liquid in a vessel, such as a barrel or keg, without the bung or spigot being removed, and that is especially adapted for such purpose when the vessels are stored in tiers one upon the other.

A further object is to provide a device of the kind that may be readily attached for the purpose to faucets of different sizes of the types in common use.

A further object is to provide a gage of the kind that in addition to measuring the depth of the liquid in a vessel will also when used for spirituous liquors indicate the proof thereof, thereby providing factors from which—the other measurements of the vessel being known—the quantity in proof gallons may be ascertained.

I accomplish these objects in the manner and by the means hereinafter described, and illustrated in the drawings.

In the drawings, Figure 1 shows the gage operatively attached to a faucet. Fig. 2 is a section through the gage. Fig. 3 is a detail view of the clamp. Fig. 4 is a top view of the lugs for the clamp. Fig. 5 is a modification of a glass tube adapted to house a hydrometer.

The gage comprises a lateral tubular arm 1 with enlarged ends 2 and 3, turned up and externally screw-threaded. Both of the ends are formed with counterbores 4 and 5. The counterbore 4 is of a diameter to receive the glass tube 6, which is secured to the end 2 by means of an internally-threaded cap 7, having a central aperture 8 to receive the glass tube and adapted to engage the externally-threaded and enlarged end 2. By running the cap upon the threads of the end a packing 9 is compressed around the tube to form a liquid-tight joint, and thereby also secure the glass tube to the end 2. The glass tube is preferably protected from breakage by means of a metallic tubular guard 10, having formed upon its length a slot 11, through which the tube may be seen, and along the slot 11 of the guard there is formed a scale 12 to indicate the height of the liquid. The tubular guard is secured to the cap 7 by means of a threaded portion 13, formed upon the lower end of the tube, which engages a similarly-threaded counterbore 14, formed centrally in the top of the cap. The top of the tube is held centrally within the guard by means of a perforated plug 15, suitably secured in the bore of the guard.

The counterbore 5, formed in the end 3, is of an area to receive the tubular stem 16, integral with the receiving-gland 17. The latter has upon its lower portion an enlarged section 18, which is externally screw-threaded and in opposite directions from the threads formed upon the end 3, and thus forming differential threaded sections adapted to engage a coincidentally-threaded coupling-sleeve 19, the revolving of which will extend or telescope the vertical arm A of the device. A liquid-tight joint is formed around the stem 16 by means of a packing 20, which is compressed around the stem by means of an internally-threaded cap 21, having a central aperture 22 to receive the stem and adapted to engage an externally-threaded nipple 23, integral with and projecting from the end 3. The top of the gland 17 is also counterbored to receive a packing 24, having a central and enlarged inlet-port 25 for some of its length and a converging throat 26. By so forming the bushing the varying ends of spigot-valves 27 can be received in the packing. The latter also projects a little distance over the top of gland 17, and both are formed with incuts 28, adapted to the curvature of the faucet 29, whereby when the telescopic arm A is clamped against the faucet the packing 24 is compressed around the tubular spigot and against the faucet to form a tight joint.

With faucets having spigots of a gradual taper the latter enters the contracted throat of the bushing, and by securing the gage to the faucet the packing is compressed in the counterbore of the receiving-gland 17 to form a tight coupling.

30 and 31 designate lugs integral with the receiving-gland 17 and projecting therefrom near the top of the gland in opposite directions. Between the lugs 30 a semicircular clamp-bar 32 is pivotally secured by means of a bolt 33. The free end 34 of the bar is threaded and when in operative position projects beyond and between the lugs 31 and has run thereon a thumb-nut 35 to clamp the telescopic arm A to the faucet, and thereby secure the gage in operative position and also compress the packing against the faucet and around the spigot.

36 designates a spirit-level, which is secured to the arm 1, by which the vessel may be leveled for measurement.

In Fig. 5 I have shown a graduated glass tube 37, similarly secured to the arm 2, which has an enlarged portion 38 of a diameter to receive a hydrometer 39, and thereby provide a device to indicate the proof of spirits as well as measure the column of the liquid in the glass tube.

From the foregoing it will be seen that I have provided a device readily attachable to faucets commonly used, and by providing a telescopic arm A the glass tube and scale can be adjusted to a line with the bottom of the barrel, as indicated by dotted line 40, and thereby insure the correct base-line for the scale, regardless of the position of the faucet in the barrel-head and the curvature of the barrel-staves. The base of the scale-column may be adjusted to the inside of the barrel or to the outside thereof. In the latter instance the thickness of the barrel-stave must be deducted from the height of the liquid indicated by the scale. After the depth of the liquid contained in the barrel is obtained the spigot is closed and the liquid is withdrawn from the gage by opening the cock 41, which is attached to the lateral arm 1 and communicating with the port in the arm.

What I claim is—

1. In a gage for liquids, a tubular U-arm, a glass tube provided with a scale and secured to the end of one arm, a telescopic extension secured to the opposite arm, a compressible tubular packing inserted into the bore of the extension, adapted to receive the spigot of a faucet, and means to clamp the extension to the faucet and compress the packing around the spigot.

2. In a gage for liquids, the combination with tube 1, having upturned ends 2 and 3, and provided with cock 41, of the scaled tube 6 packed in the end 2, and the extension A, secured to the arm 3 and provided with a packing 17, adapted to receive the spigot of a faucet, and clamp 32, adapted to compress the packing around the spigot and against the faucet.

3. In a gage for liquids, the combination with tube 1, having upturned ends 2 and 3, and provided with cock 41, and a level 36 of the scaled tube 6, packed in the end 2, and the extension A secured to the arm 3 and provided with a packing 24 adapted to receive the spigot of a faucet, and clamp 32, adapted to compress the packing around the spigot and against the faucet.

4. In a gage for liquids, the combination with tube 1, having upturned ends 2 and 3, and provided with cock 41, of the scaled tube 37 packed in the end 2, having housed therein a hydrometer 39, and the extension A secured to the arm 3 and provided with a packing 24, adapted to receive the spigot of a faucet, and clamp 32, adapted to compress the packing around the spigot and against the faucet.

In witness whereof I have hereunto set my hand this 8th day of January, A. D. 1901.

ADOLPH POLLATSEK.

Witnesses:
  F. S. MACOMBER,
  HERMAN H. MARTIN.